(12) United States Patent
Snyder et al.

(10) Patent No.: US 7,466,082 B1
(45) Date of Patent: Dec. 16, 2008

(54) ELECTRONIC CIRCUIT REDUCING AND BOOSTING VOLTAGE FOR CONTROLLING LED CURRENT

(75) Inventors: Mark W. Snyder, Hockessin, DE (US); Norman A. Messinger, Center Square, PA (US)

(73) Assignee: Streamlight, Inc., Eagleville, PA (US)

( * ) Notice: Subject to any disclaimer, the term of this patent is extended or adjusted under 35 U.S.C. 154(b) by 436 days.

(21) Appl. No.: 11/335,486

(22) Filed: Jan. 19, 2006

Related U.S. Application Data (60) Provisional application No. 60/646,804, filed on Jan. 25, 2005.

(51) Int. Cl.
*H05B 37/02* (2006.01)

(52) U.S. Cl. ............ 315/200 A; 315/224; 315/307

(58) Field of Classification Search ......... 315/200 A, 315/246, 209 R, 224, 291, 307
See application file for complete search history.

(56) References Cited

U.S. PATENT DOCUMENTS

| | | | |
|---|---|---|---|
| 3,913,006 A | 10/1975 | Fillmore |
| 3,974,439 A | 8/1976 | Holland |
| 4,144,112 A | 3/1979 | Hasegawa |
| 4,155,112 A | 5/1979 | Miller et al. |
| 4,404,624 A | 9/1983 | Yamazaki |
| 4,499,525 A | 2/1985 | Mallory |
| 4,866,430 A | 9/1989 | Chek |
| 5,179,508 A | 1/1993 | Lange et al. |
| 5,418,433 A | 5/1995 | Nilssen |
| 5,418,434 A | 5/1995 | Kamens et al. |
| 5,446,366 A | 8/1995 | Bassett et al. |
| 5,629,105 A | 5/1997 | Matthews |
| 5,646,484 A | 7/1997 | Sharma et al. |
| 5,894,200 A | 4/1999 | Goodale, Jr. et al. |
| 6,024,471 A | 2/2000 | McDermott |
| 6,046,572 A | 4/2000 | Matthews |
| 6,222,138 B1 | 4/2001 | Matthews |
| 6,239,555 B1 | 5/2001 | Rachwal |
| 6,246,184 B1 | 6/2001 | Salerno |
| 6,249,089 B1 | 6/2001 | Bruwer |
| 6,296,367 B1 | 10/2001 | Parsons et al. |
| 6,320,330 B1 | 11/2001 | Haavisto et al. |
| 6,366,028 B1 | 4/2002 | Wener et al. |
| 6,621,225 B2 | 9/2003 | Bruwer |
| 6,650,066 B2 | 11/2003 | Bruwer |
| 6,724,156 B2 | 4/2004 | Fregoso |
| 6,791,283 B2 | 9/2004 | Bowman et al. |
| 6,801,023 B2 | 10/2004 | Wu et al. |

(Continued)

OTHER PUBLICATIONS

Don Lancaster, "Tech Musings", May, 1998, pp. 124.1-124.6.

(Continued)

*Primary Examiner*—David Hung Vu
(74) *Attorney, Agent, or Firm*—Clement A. Berard, Esq.; Dann, Dorfman, Herrell & Skillman, PC (57) ABSTRACT

An electronic circuit comprises a switching voltage boosting circuit and a current regulating circuit for controlling current flowing through a solid state light source. A control circuit controls the current regulating circuit and the switching voltage boosting circuit to control the magnitude of current flowing through the solid state light source. An error signal produced by the control circuit for controlling the current flowing through the solid state light source may further control the switching voltage boosting circuit.

47 Claims, 3 Drawing Sheets

U.S. PATENT DOCUMENTS

| | | | |
|---|---|---|---|
| 6,841,941 | B2 | 1/2005 | Kim et al. |
| 6,909,249 | B2* | 6/2005 | Otake ................... 315/224 |
| 6,952,084 | B2 | 10/2005 | Bruwer |
| 6,984,900 | B1 | 1/2006 | Bruwer |
| 7,015,650 | B2* | 3/2006 | McGrath ............. 315/200 A |
| 2002/0097576 | A1 | 7/2002 | Sharrah |
| 2004/0189262 | A1 | 9/2004 | McGrath |
| 2004/0207370 | A1 | 10/2004 | Suzuki |
| 2004/0127655 | A1 | 11/2004 | Bruwer |
| 2004/0227409 | A1 | 11/2004 | Bruwer |
| 2005/0077837 | A1 | 4/2005 | Kim |
| 2005/0083626 | A1 | 4/2005 | Bruwer |
| 2005/0121980 | A1 | 6/2005 | Bruwer |
| 2005/0122710 | A1 | 6/2005 | Kim |
| 2005/0122712 | A1 | 6/2005 | Kim |
| 2005/0122714 | A1 | 6/2005 | Matthews |
| 2005/0128741 | A1 | 6/2005 | Matthews |
| 2005/0140310 | A1 | 6/2005 | Bruwer |
| 2005/0237737 | A1 | 10/2005 | Kim |

OTHER PUBLICATIONS

Henry Schneiker, "The Birth of a New Lamp System," http://www.hdssystems.com/ActionLightHistory.html, Apr. 1999, 4 Pages.

FLASHLIGHTMUSEUM.COM, "Flashlights, HDSS Systems 24 LED Action Light," http://www.flashlightmuseum.com/flashlight_view.cfm?method=browse&brand=HDS Systems, I... , Printed Jun. 20, 2005, 1 Page.

FLASHLIGHTMUSEUM.COM, "Flashlight: HDS systems, Inc. (1) 24 LED Action Light," http://www.flashlightmuseum.com/flashlight_list.cfm?method=browse&brand=HDS%20System... , Printed Jun. 20, 2005, 1 Page.

Equipped to Survive, "LED Flashlights," Equipped To Survive (tm)—LED Flashlight Reviews, http://www.equipped.com/led_lights.htm, Printed Jun. 20, 2005, 5 Pages.

Equipped to Survive, "LED Flashlights," Equipped To Survive (tm)—LEd Flashlight Reviews, http://www.equipped.com/led_lights1.htm, © 200,1 Printed Jun. 20, 2005, 3 Pages.

Equipped to Survive, "LED Flashlights," Equipped To Survive (tm)—LED Flashlight Reviews—Light Optronics, LEDtronics, LEDtronics, Innov . . . , http://www.equipped.com/led_lights2.htm, © 2001, Printed Jun. 20, 2005, 4 Pages.

Brian Pease, "Minutes of the 2003 Annual Meeting of the Communications & Electronics Section of the NSS," http://www.caves.org/section/commelect/cemins03.html, Dated Aug. 4, 2003, Printed Jun. 20, 2005, 4 Pages.

Original Lightbulb Voltage Regulator, "A quick comparision between the original and the LVRs:," http://www.cs.indiana.edu/~willie/lvr1.html, Printed Sep. 19, 2005, 2 Pages.

Willie Hunt, "Willie Hunt's Lightbulb Voltage Regulators," http://www.cs.indiana.edu/~willie/lvr.html, Printed Sep. 19, 2005, 12 Pages.

http:/www.cs.indiana.edu/~willie/LEDhead.JPG, Printed Sep. 19, 2005, 1 Page.

Henry Schneiker, "Can you Patent an LED Flashlight," Dated Jan. 2003, 2 Pages.

* cited by examiner

ELECTRONIC CIRCUIT REDUCING AND BOOSTING VOLTAGE FOR CONTROLLING LED CURRENT

This Application claims the benefit of the priority of U.S. Provisional Patent Application No. 60/646,804 filed Jan. 25, 2005.

The present invention relates to an electronic circuit and, in particular, to an electronic circuit for controlling current through a solid state light source.

Solid state light sources such as high-efficiency, high-power light-emitting diodes (LEDs) are increasingly being utilized to replace less efficient incandescent lamps in battery operated and other portable apparatus. An incandescent lamp is a resistance device that is typically operated at a specified voltage, e.g., its rated or nominal operating voltage. Because lamp resistance is substantially constant (once operating temperature is reached), the applied voltage and resulting current through the lamp are substantially linearly related, and so slight increases and decreases in the applied voltage produce similarly slight increases and decreases in the current flowing through the lamp.

Unlike an incandescent lamp, however, an LED is not a resistance device, but is a non-linear semiconductor device that exhibits a diode-like exponential I-V characteristic. An LED requires an applied voltage that exceeds a threshold value in order to have substantial current flow therethrough and to produce substantial light. Once the LED voltage exceeds the threshold value, however, relatively small increases in applied voltage can produce relatively large increases in current, because the applied voltage and resulting current through the LED are substantially exponentially related. In addition, too high a current produces undesirable heating which decreases the efficiency and reliability of the LED. Thus, it is undesirable to operate an LED by controlling the voltage applied thereto.

Typically, a resistor is connected in series with an LED to "drop" the applied voltage to a level suitable for the LED at a desired operating current, thereby mitigating the non-linearity of the LED itself. Unfortunately, the power dissipated in the dropping resistor is wasted, thereby substantially reducing the overall efficiency and the length of time (operating time) that a battery or other portable power source can energize the LED sufficiently to produce useful light. The LED operating time is further reduced because as the battery discharges and its voltage decreases, it reaches a level near the LED threshold level at which the LED output decreases rapidly and so becomes useless as a source of light.

While a voltage boosting circuit employing PWM switching operation has been employed to increase the ability of a battery to power an LED when the battery voltage is less than the LED threshold voltage, the inefficiency caused by the resistor in series with the LED remains a problem.

Accordingly, there is a need for an electronic circuit that provides voltage boosting while avoiding the inefficiency of the conventional dropping resistor and that also operates when the supply voltage exceeds the operating voltage of the solid state light source. It would also be desirable that the electronic circuit also mitigate the effect of the non-linearity in the I-V characteristic of a solid state light source.

To this end, an electronic circuit may comprise a switching voltage boosting circuit for controllably increasing a supply potential, a current regulating circuit for controlling current flowing through a solid state light source, and a control circuit responsive to current flowing through the solid state light source for controlling the current regulating circuit and the switching voltage boosting circuit to control the magnitude of current flowing through the solid state light source.

BRIEF DESCRIPTION OF THE DRAWING

The detailed description of the preferred embodiment(s) will be more easily and better understood when read in conjunction with the FIGURES of the Drawing which include.

In the Drawing, where an element or feature is shown in more than one drawing figure, the same alphanumeric designation may be used to designate such element or feature in each figure, and where a closely related or modified element is shown in a figure, the same alphanumerical designation primed or the like may be used to designate the modified element or feature. It is noted that, according to common practice, the various features of the drawing are not to scale, and the dimensions of the various features are arbitrarily expanded or reduced for clarity, and any value stated in any Figure is given by way of example only.

DESCRIPTION OF THE PREFERRED EMBODIMENT

Figure 1:
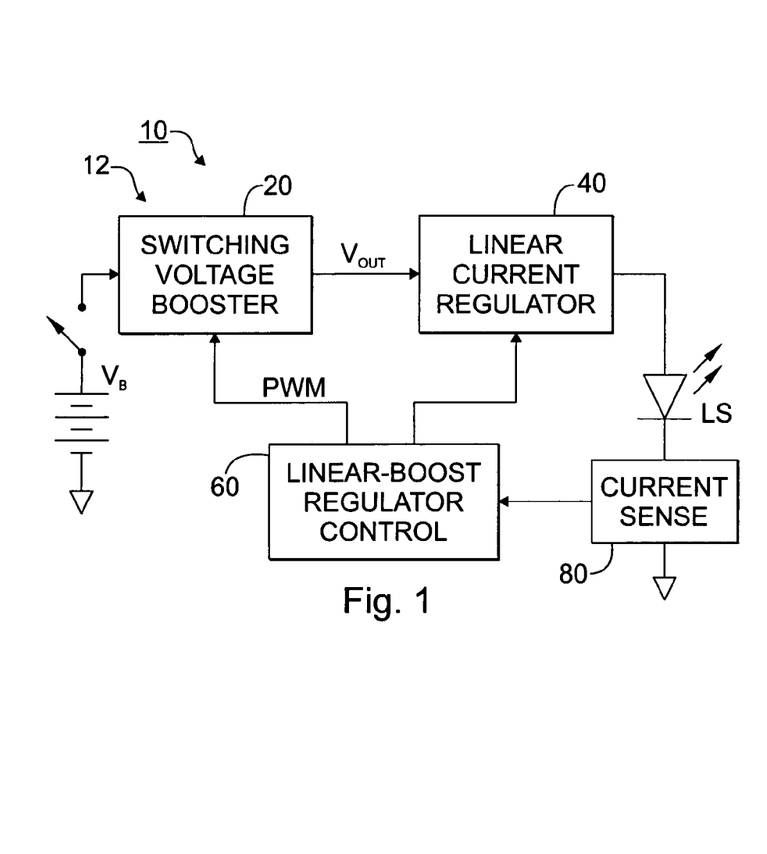
FIG. 1 is a schematic block diagram illustrating an example electrical circuit including a voltage boosting arrangement.

FIG. 1 is a schematic block diagram illustrating an example electrical circuit 10 including a voltage boosting arrangement 20, 60. In circuit 10, for example, a circuit suitable to be employed in a flashlight 12, solid-state light source LS produces light when energized by electrical energy provided by battery or other power source B, i.e. when switch SW is closed. Typically, when battery B is fully charged or near to full charge, battery B provides a voltage $V_B$ that is sufficiently high to energize light source LS to produce light. As battery B discharges, the voltage $V_B$ it provides decreases and typically falls below the voltage needed to operate light source LS. As battery B becomes substantially discharged or approaches being fully discharged, the voltage $V_B$ it provides decreases to a very low level insufficient to energize light source LS to produce light.

For example, a typical example light-emitting diode (LED) light source LS may operate suitably for use in a flashlight or other portable device 12 when conducting about 580 milliamperes (mA) of current, at which level it requires a voltage of about 3.2 volts (V). A typical example battery B of three series cells may produce a voltage $V_B$ of about 4.2-4.5 V when fully charged, which is sufficient to operate LED LS, will produce only about 0.4-0.8 V as is approaches full discharge, which is not sufficient to operate LED LS. Where circuit 10 is employed in a flashlight 12, the elements thereof, e.g., elements 20, 40, 60, 80, are disposed in a housing 12 thereof.

In circuit 10, a linear current regulator 40 is disposed in series with light source LS to regulate the current flowing through switching voltage booster 20 to a desired value. Linear current regulator 20 includes a current control element and is coupled to linear-boost regulator control 60 for receiving a control signal that determines the magnitude of current flowing through linear current regulator 40. Current sensor 80 is coupled in series with light source LS and current regulator 40 for sensing the current flowing therethrough. Current sensor 80 is coupled to linear-boost regulator control 60 for providing feedback of the magnitude of the light source LS current thereto. Regulator control 60 is responsive to the sensed current magnitude from current sensor 80 to provide the control signal that determines that magnitude of current flowing through linear current regulator 40, thereby to linearly regulate the current flowing through light source LS.

Thus, the foregoing linear current regulator and control 40, 60, 80 provides a linear feedback controlled circuit that determines the magnitude of the current flowing through light source LS which is directly sensed to provide feedback. However, the foregoing linear current regulator and control 40, 60, 80 can regulate the current flowing only when the magnitude of the voltage $V_{OUT}$ at the input to current regulator 40 is greater than the voltage across light source LS and current sensor 80. While this voltage condition is easily met when battery B is at or near full charge, is cannot be met by battery B when it is substantially discharged.

To provide for operation of linear current regulator and control circuit 40, 60, 80, it is preceded by switching voltage booster circuit 20 which maintains the voltage $V_{OUT}$ at its output and at the input of linear current regulator 40 at a magnitude sufficient to operate linear current regulator 40. If the input voltage $V_{OUT}$ to linear current regulator 40 decreases below the magnitude necessary for linear current regulator 40 to linearly regulate current, then the current that flows therethrough and through light source LS also decreases.

Preferably, switching voltage booster 20 is of a circuit arrangement that provides for the conduction of the voltage $V_B$ of battery B to linear current regulator 40 with little voltage loss when battery B provides voltage $V_{OUT}$ of sufficient magnitude to operate linear current regulator 40. When the voltage $V_B$ of battery B is not of such sufficient magnitude, switching voltage booster 20 is caused to switch by a switching control signal from linear-boost regulator control 60 to increase the voltage $V_B$ from battery B to a magnitude $V_{OUT}$ sufficient to operate linear current regulator 40.

Linear-boost regulator control 60 provides a pulse-width modulated (PWM) control signal wherein the relative "on" times and "off" times thereof determine the relative "on" times and "off" times of the switching element of switching voltage booster 20 which in turn controls the degree of increase or "boost" of battery B voltage $V_B$ that is provided by switching voltage booster 20 at output $V_{OUT}$. The "on" times and "off" times of the PWM control signal are responsive to the magnitude of current sensed by current sensor 80.

Thus, there is a current feedback from current sensor 80 that also acts through linear-boost regulator control 60 and switching voltage boost 20 to provide sufficient increase or boost to the voltage $V_B$ of battery B to maintain linear current regulator 40 for linearly regulating the current flowing through light source LS. Linear-boost regulator control 60 is thus part of two feedback control circuits—one to control linear current regulator 40 to determine the current flowing in light source LS and a second to control switching voltage boost 20 to maintain sufficient voltage $V_{OUT}$ at the input to linear current regulator 40 for it to control the current flowing in light source LS.

Preferably, linear-boost regulator control 60 generates the control signal for controlling linear current regulator 40 directly from an error signal ε developed from the sensed current 80 and a reference level, and generates the PWM control signal for controlling switching voltage boost 20 from the error signal ε developed from the sensed current 80, whereby current regulator 40 is maintained in linear current regulating operation and switching voltage boost 20 operates when necessary to maintain the output voltage $V_{OUT}$ thereof at a sufficient magnitude for linear current regulator 40 to regulate current.

This arrangement that controls/regulates the magnitude of current flowing in the light source LS is considered beneficial in view of the characteristics of the typical solid state light source, such as a light-emitting diode. If an LED is powered from a voltage source, the applied voltage remains constant and so the current flowing through the LED varies according to the LED characteristics, e.g., external temperature and internally generated heat, thereby allowing variation of current and of light output.

An LED typically produces light in direct relation to the current flowing therethrough, so that if the current is too low, the LED light output is less than a desired level/brightness. At higher current levels, however, the additional light output is not proportional to the current, but the LED becomes less efficient in terms of light output per unit of current or power. Thus, additional current above a desired magnitude produces much more additional heat than it does light. Accordingly, it is beneficial to regulate the magnitude of LED current as in the present arrangement.

Figure 2:
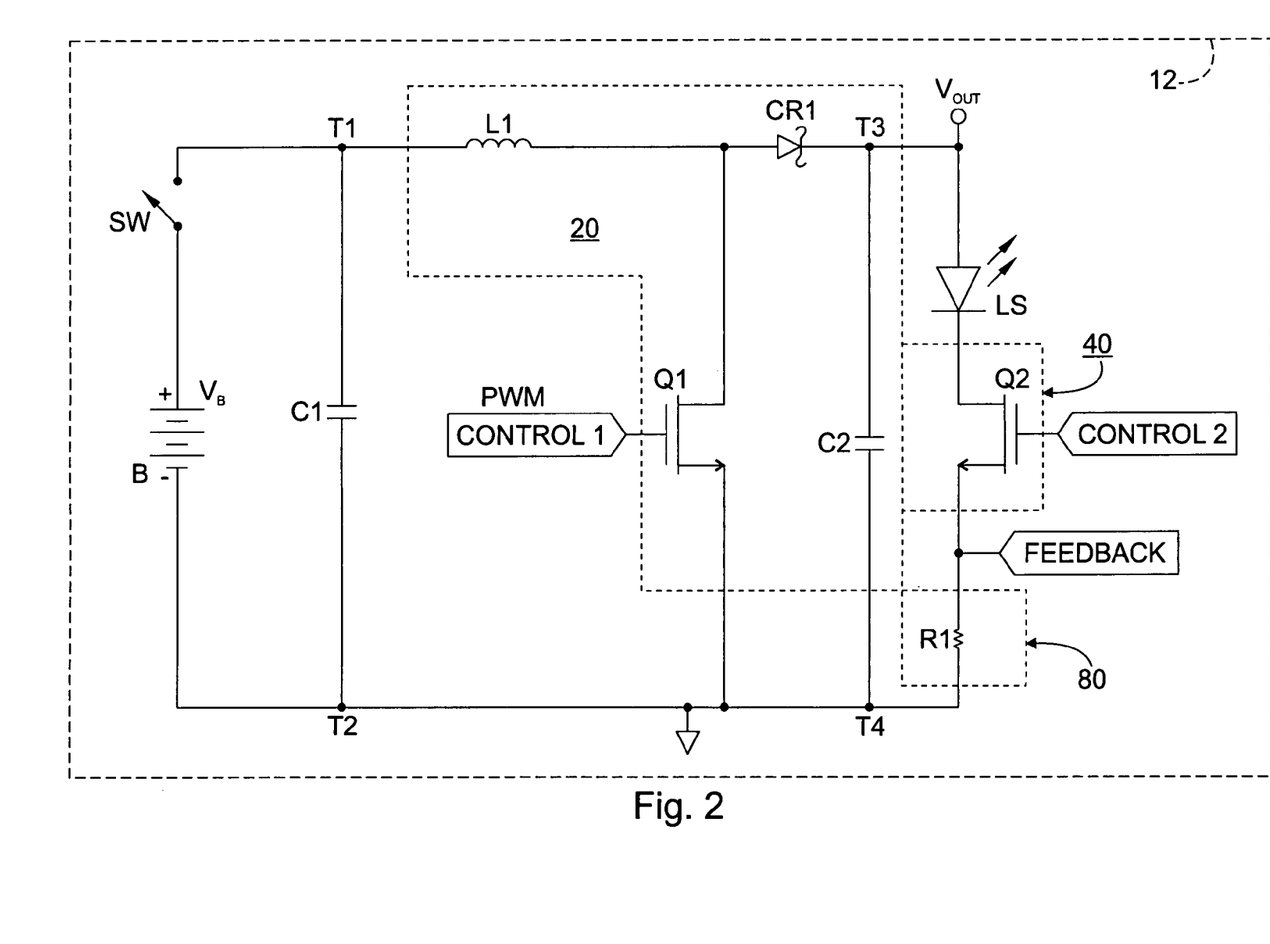
FIG. 2 is an electrical schematic diagram illustrating an example voltage boosting portion and illustrating an example current regulating portion of the example electrical circuit of FIG. 1.

FIG. 2 is an electrical schematic diagram illustrating an example switching voltage boosting circuit portion 20 and illustrating an example linear current regulating circuit portion 40 of the example electrical circuit 10 of FIG. 1. Circuits 20, 40 are enabled to operate when switch SW is closed and to not operate when switch SW1 is open. Voltage $V_{OUT}$ produced by switching voltage booster 20 is essentially zero volts unless switch SW is closed.

Linear current regulator 40 comprises a transistor Q1 having its conduction path (drain-to-source in the case of a field-effect transistor (FET)) in series with solid-state light source LS and current sensor 80 resistor R1, and having its control electrode (gate in the case of a FET) coupled for receiving control signal CONTROL 2 from linear-boost regulator control 60. Transistor Q1 preferably operates in its linear operating region and, when switching voltage boosting circuit 20 is operating, preferably operates in its linear operating region at a low drain-to-source voltage close to saturation.

Switching voltage boost circuit 20 includes an inductance L1 and a diode CR1, preferably a Schottky diode, in series between battery B and terminal $V_{OUT}$, whereby battery B voltage $V_B$ is conducted to terminal $V_{OUT}$ without substantial voltage loss, e.g., with only the relatively small forward voltage drop of Schottky diode CR1 and a small voltage loss due to the small resistance of inductance L1. Switching transistor Q1 is connected between the junction of inductance L1 and diode CR1 and is pulsed "on" and "off" responsive to PWM control signal CONTROL 1 with diode CR1 conducting when transistor Q1 is not conducting and not conducting when transistor Q1 is conducting. Capacitor C2 filters the voltage at terminal $V_{OUT}$. The combination of L1, Q1, CR1 and C1 as connected comprise a conventional voltage boosting circuit.

Switching transistor Q1 is off continuously when $V_{OUT}$ is sufficiently high for transistor Q2 of linear current regulator 40 to control the current therethrough, in which case control signal CONTROL 1 is continuously "low" for zero "on" time. Transistor Q1 is switched on and off by PWM control signal CONTROL 1 when battery B voltage $V_B$ is to be increased to maintain $V_{OUT}$ at a level sufficiently high for transistor Q2 to control current. Voltage boosting circuit 20 may be said to have input terminals T1, T2 whereat a supply potential, such as the potential $V_B$ of battery B, is received, and output terminals T3, T4 whereat an increased potential $V_{OUT}$ is produced.

Current sensing 80 resistor R1 is preferably a relatively small resistance so as to minimize the voltage drop thereacross and the power dissipated therein. A resistance of 0.1 ohm is satisfactory for controlling a current in the range of 500-600 mA in light source LS. Optional capacitance C1 provides filtering of battery B voltage $V_B$. By way of example, an inductance L1 of about 10-20 μH and a capacitance C2 of about 22 μF are suitable for a switching voltage booster 20 operating at about 150-170 KHz for delivering about 500-600 mA at a $V_{OUT}$ of about 3.15 to 4.15 volts. Transistors Q1 and Q2 may be any suitable types of FETs that are rated to carry the desired currents and to withstand the operating voltages encountered. An example battery B is typically includes three cells, e.g., AA cells, C cells, D cells and the like, to produce a voltage $V_B$ of about 4.2-4.5 volts at full charge.

One fresh, non-rechargeable alkaline cell having full capacity, i.e. at initial operation prior to substantial discharge, will provide a voltage of about 1.4-1.5 volts prior to being discharged substantially, and so three such alkaline cells in series will produce about 4.2-4.5 volts prior to being discharged substantially. A single fully charged lithium-ion rechargeable cell will produce a voltage of about 3.9-4.1 volts prior to being discharged substantially. It is noted that a single alkaline cell may be discharged down to about 0.8 volts before being replaced, however, a single Li-ion rechargeable cell is typically discharged to about 2.5 volts before needing to be recharged.

Figure 3:
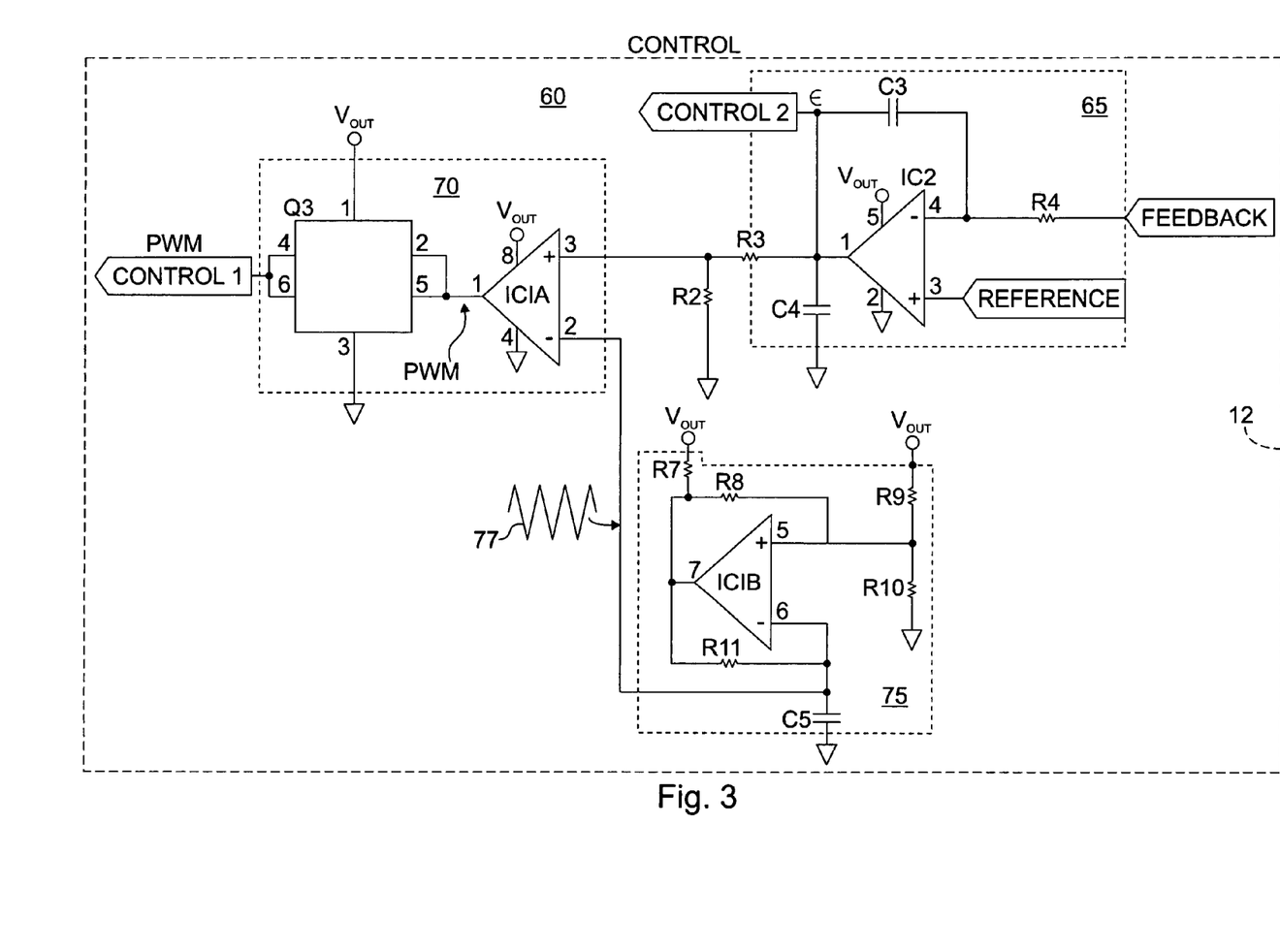
FIG. 3 is an electrical schematic diagram illustrating an example control circuit portion of the example electrical circuit of FIG. 1.

FIG. 3 is an electrical schematic diagram illustrating an example control circuit 60 portion of the example electrical circuit 10 of FIG. 1. The feedback control loop 65 for current regulator 40 will be described first, followed by the feedback control circuit 70, 75 for switching voltage booster 20. Feedback control loop 65 includes a differential input amplifier or comparator IC2 that receives a feedback signal via resistor R4 from current sensor 80, R1 at its inverting input and a reference level REFERENCE at its non-inverting input. Comparator IC2 produces an error signal ϵ at its output that comprises control signal CONTROL 1 which is applied to the control electrode of linear current regulating transistor Q2 of linear current regulator 40. Preferably, comparator IC2 is a high-gain amplifier.

If the current sensed by resistor R1 is lower that the desired magnitude, the level at the non-inverting input of comparator amplifier IC2 will exceed the level at the inverting input thereof, and so comparator amplifier IC2 will increase error signal ϵ which increases the conduction of transistor Q2 thereby to increase the current flowing therethrough and through light source LS. If the current sensed by resistor R1 is higher that the desired magnitude, the level at the non-inverting input of comparator amplifier IC2 will be less than the level at the inverting input thereof, and so comparator amplifier IC2 will decrease error signal ϵ which decreases the conduction of transistor Q2 thereby to decrease the current flowing therethrough and through light source LS. Thus, the current flowing through light source LS is linearly regulated through negative feedback to a desired magnitude set by reference level REFERENCE.

In feedback loop circuit 65, capacitors C3 and C4 are employed to shape the gain vs. frequency characteristic thereof, and particularly comparator amplifier IC2, to stabilize the current regulating feedback loop 65 of control 60 against oscillation and to smooth the error signal ϵ.

The feedback control loop 70, 75 for switching voltage booster 20 comprises a comparator 70 and a triangular signal generator 75. Error signal ϵ is applied to the non-inverting input of comparator amplifier IC1A of comparator 70 via resistive voltage divider comprising resistors R2, R3, so as to be within the range of the triangular voltage signal generated by generator circuit 75 when switching voltage booster 20 is to operate to increase battery B voltage $V_B$ and so as to be less than the lower level of that range when switching voltage booster 20 is not switching to increase battery B voltage $V_B$. Circuit Q3 increases the PWM signal produced at the output of comparator amplifier IC1A to the voltage and current levels necessary for PWM control signal CONTROL 1 to drive transistor Q1 to be "on" and "off" in switching voltage booster 20.

In operation, when battery B voltage $V_B$ is sufficient for linear current regulator 40 transistor Q2 to control the current flowing through light source LS and current sensor 80 resistor R1 to the desired magnitude, error signal ϵ is relatively small and the voltage level at the non-inverting input of comparator amplifier IC2 is less than the lowest level of triangular voltage signal 77. As a result, the output of comparator IC1A remains low and switching transistor Q1 is maintained "off" so that voltage booster 20 does not operate to increase the voltage $V_B$ provided by battery B and $V_{OUT}$ is the battery B voltage $V_B$ less the forward voltage of Schottky diode CR1.

As the voltage $V_B$ of battery B decreases, so does the voltage across the drain-source conduction path of transistor Q2 which approaches saturation. As transistor Q2 enters saturation its gain decreases and amplifier or comparator IC2 increases error signal ϵ to provide additional current to light source LS. When error signal ϵ increases sufficiently to come within the range of triangular voltage signal 77, amplifier IC1A then generates an output pulse during the time that the level of error signal ϵ exceeds that of triangular voltage signal 77 which produces via circuit Q3 a drive pulse to transistor Q1 whereby switching voltage booster increases the voltage $V_B$ from battery B to a level at $V_{OUT}$ that is sufficient to maintain transistor Q2 near its saturation region, but not fully saturated. As the voltage $V_B$ of battery B decreases further, error signal ϵ increases further and the width of the pulse produced by comparator IC1A and therefore the drive pulse for transistor Q1 both increase, thereby to increase the degree of boosting of the battery B voltage $V_B$ that is provided by switching voltage booster 20.

Thus, error signal ϵ pulse width modulates the drive signal PWM CONTROL 1 to switching transistor Q1 of switching voltage booster 20. Thus, linear boost regulator control 60 acts to selectively increase or boost the voltage $V_B$ provided by battery B to a level that could be said to optimize operation of current regulator 40, e.g., to maintain its ability to control the magnitude of current flowing through light source LS while maintaining a relatively low voltage across current regulating transistor Q2 so as to maintain a relatively high efficiency.

Example triangular signal generator 75 comprises an oscillator that includes an amplifier IC1B that provides gain for oscillation and a resistor R11 and capacitor C5 network that sets the period of the oscillation and therefore the frequency thereof. Because the output of circuit IC1B is at either a high voltage (substantially $V_{OUT}$) and a low voltage (ground or reference), resistor R11 tends to provide an approximate constant current to charge and discharge capacitance C5, thereby to produce a substantially triangular signal at the junction of resistor R11 and capacitance C5. Resistors R7, R8, R9 and R10 provide appropriate bias voltages at the non-inverting input of amplifier IC1B and, in addition, resistor R8 provides positive feedback at the non-inverting input of amplifier IC1B so as to provide hysteresis to assure switching between high and low output levels at the output of amplifier IC1B.

In a typical circuit 75, for example, a capacitor of about 0.001 µF in combination with a suitable value of resistor R11 may be employed to produce a one volt peak-to-peak triangular wave 77 at a frequency of about 150-170 KHz, although operation may be at any desired frequency or over any desired range of frequencies as might be considered satisfactory. With a $V_{OUT}$ of about 3.25 volts the lower voltage of triangular signal 77 is about 1.0 volt. Because comparator amplifiers IC1A, IC1B, reference 95, circuit Q3 and their biasing circuits all operate from the supply voltage $V_{OUT}$, changes in $V_{OUT}$ do not materially affect the operating voltages of the circuits described. Suitable circuits for IC1 include a type TLC3702 comparator integrated circuit available from Texas Instruments, Inc., located in Dallas, Tex., for IC2 include a type MCP6001 integrated circuit operational amplifier available from Microchip Technology Inc. located in Chandler, Ariz., and for Q3 include a type ZXTD6717E6TA dual transistor (NPN, PNP) integrated circuit available from Zetex plc located in Manchester, United Kingdom.

Alternatively, control 60 may be arranged to provide suitable pulsed drive signals to switching voltage booster 20 in any suitable manner. For example, to operate switching voltage booster 20 at a variable frequency rather than at a fixed frequency as described, a drive pulse, typically of a predetermined duration, could be provided to switching voltage booster 20 by drive pulse generator 70 each time the current in the LED fell to or below a desired predetermined level sufficiently to produce an error signal ε of sufficient level. Thus, circuit 70 would provide a series of drive pulses at variable times (e.g., a variable frequency PWM signal) for operating switching voltage booster 20. The times at which such drive pulses would be generated is a function of the circuit elements (e.g., the inductance of inductor L1 and capacitance and capacitor C2) and the operating conditions of circuit 10 (e.g., the voltage across light source LS, the voltage across linear regulator 20, Q2, the current flowing through light source LS and current regulator 20, Q2, and the voltage $V_B$ of battery B), and so the drive pulse "period" and "frequency" will vary with operating conditions. Other arrangements for varying the on time to off time of switching voltage booster 30, Q1 may be employed, such a gated oscillator, pulse frequency control and any other suitable method.

Thus, circuit arrangement 10 includes a negative feedback circuit that acts primarily to establish and maintain a desired magnitude of current flowing in a light source LS and that also acts to increase or boost the voltage $V_B$ of battery B as needed to maintain the desired magnitude of current in light source LS.

An example embodiment of circuit 10 has been found to provide an improvement in efficiency of about 10-15% over a prior art arrangement employing a series voltage dropping resistor (both circuits operated from a three-cell battery to power the same type of LED). This example circuit 10 operated satisfactorily to maintain a desired current of about 580-650 mA in the LED as the battery voltage $V_B$ decreased from an initial voltage of about 4.5 volts to a discharged voltage of about 0.2 volt, and could be turned on and would restart operation when the battery voltage $V_B$ was about 1.0-1.5 volts or greater. Typically, three C-size battery cells may be employed to provide sufficient energy to operate light source LS to produce light for several hours of operation.

Figure 4:
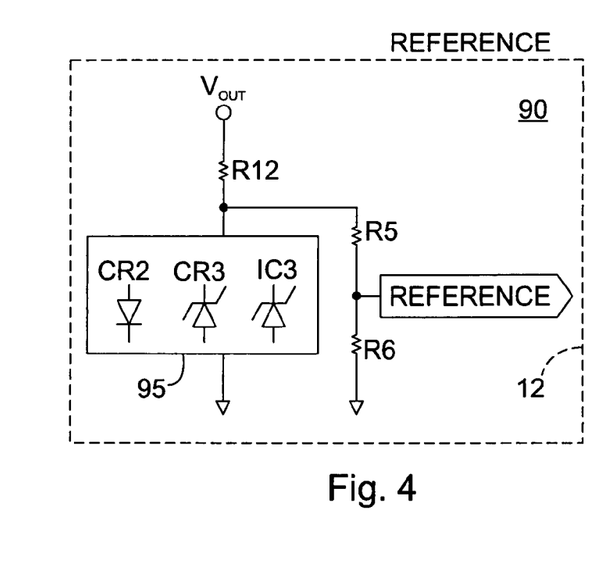
FIG. 4 is an electrical schematic diagram illustrating an example reference potential source useful with the example electrical circuit of FIG. 1.

FIG. 4 is an electrical schematic diagram illustrating an example reference potential source 90 useful with the example electrical circuit 10 of FIG. 1. Reference source 90 includes a suitable source 95 of a reference voltage, such as an integrated circuit reference IC3, a band-gap reference IC3, a diode CR2, or a Zener diode reference CR3. Source 90 further includes a biasing resistor R12 connected to a suitable potential, e.g., battery B voltage $V_B$, for biasing source 95, and may also include a voltage divider comprising resistors R5, R6, for reducing the reference potential produced by source 95 to a level REFERENCE compatible with the desired potential produced by current sensor 80 resistor R1.

In a typical circuit 10, for example, reference source 95 may be a type 1N4148 P-N diode CR2 or a type LM4041-1.2 band-gap reference integrated circuit IC3 that is available from several suppliers and that produces a reference voltage of about 1.2 volts, and resistors R5, R6 produce a voltage of about 58-65 millivolts for producing a current of about 580-650 mA through light source LS where resistor R1 is about 0.1 ohm, as might be desirable for operating a Luxeon LXHL-MW10 high brightness white LED available from Lumileds Lighting located in San Jose, Calif.

In the case wherein reference source 95 is a 1N4148 diode CR2, the current applied to light source LS tends to be slightly higher each time the light 12 including circuit 10 is initially energized and then it gradually reduces over a period of time to a nominal value at which it is regulated by circuit 10. This characteristic results from the heating of diode CR2 that occurs during operation of light 12 as a result of heat generated by the operation of circuit 10 and the light source LS. Heating of the reference diode CR2 in conjunction with the negative temperature coefficient of the forward voltage of the 1N4148 diode CR2, e.g., typically about −1.9 mv/C°, produces a suitable reduction of the reference voltage produced by reference diode CR2, and hence the current flowing in light source LS and the intensity of the light produced thereby.

This feature desirably produces a slightly higher light intensity each time light 12 is energized, and so is beneficial for a typical user who generally uses light 12 only for short periods of time. Thereafter, the light intensity decreases slightly until a nominal level is reached, thereby to tend to extend the run time of light 12 on those occasions wherein light 12 is operated for an extended time. Thus, a user tends to have the advantages of both higher light intensity and longer run time, generally in accordance with the manner in which the light 12 is operated.

In one example embodiment employing a forward biased 1N4148 diode CR2 for reference source 95, the light intensity each time light 12 is initially energized after being OFF for a time sufficient to cool is up to about 3500 candlepower and decreases thereafter to a nominal value of about 2900 candlepower over a period of about 10-30 minutes. Typically, light 10 will cool to ambient temperature in about the same time, e.g., about 10-30 minutes. While such change in intensity might be noticeable to a user, it is not so great as to materially impair the usefulness of the light 12.

In the case wherein reference source 95 is a band-gap reference IC3 or other temperature-stable source, the current applied to light source LS remains substantially at a nominal value each time the light 12 including circuit 10 is initially energized and thereafter, even in the presence of heating of circuit 10 and the elements thereof. Thus the intensity of light produced by light source LS also remains substantially at a nominal value. For example, in one embodiment an intensity is set at a desired value within a range of about 2900-3500 candlepower. If the nominal value is set higher in the range, the light intensity tends to be greater and the run time of the light 12 is somewhat shorter, however, if the nominal value is set lower in the range, then the run time tends to be longer and the light intensity is slightly less.

An electronic circuit 10 for operating a solid state light source LS comprises a switching voltage boosting circuit 20, L1, Q1, CR1 for controllably increasing a supply potential, a current regulating circuit 40, 80, Q2, R1 coupled to the switching voltage boosting circuit 20, L1, Q1, CR1 for controlling current flowing through a solid state light source LS, and a control circuit 60, IC1, IC2 responsive to current flowing through the solid state light source LS for controlling the current regulating circuit 40, 80, Q2, R1 to control the magnitude of current flowing through the solid state light source LS and for controlling the switching voltage boosting circuit 20, L1, Q1, CR1 to increase the supply potential when necessary for operating the current regulating circuit 40, 80, Q2, R1. That is, switching voltage boosting circuit 20, L1, Q1, CR1 controllably provides a potential $V_{OUT}$ that is greater than a supply potential $V_B$, and control circuit 60, IC1, IC2 controls the switching voltage boosting circuit 20, L1, Q1, CR1 to provide the potential $V_{OUT}$ greater than the supply potential $V_B$ for operating the current regulating circuit 40, 80, Q2, R1. Switching voltage boosting circuit 20, L1, Q1, CR1 may comprise an inductor L1 for receiving a supply potential $V_B$ and connected in series with a rectifier CR1 connected to current regulating circuit 40, and a controllable electronic switch Q1 connected to the connection of inductor L1 and rectifier CR1, wherein controllable switch Q1 may be controlled by control circuit 60. Controllable electronic switch Q1 may be controlled by a pulse-width modulated signal CONTROL 1 from control circuit 60. The current regulating circuit 40 may comprise a linear current regulator 40 coupled between switching voltage boosting circuits 20, L1, Q1, CR1 and solid state light source LS, wherein the conduction of linear current regulator 40 is controlled by control circuit 60 in a linear manner. Control circuit 60 may comprise a first comparator IC2 responsive to a reference REFERENCE and to the current flowing through solid state light source LS for providing an error signal $\epsilon$ for controlling current regulating circuit 40. Control circuit 60 may further comprise a second comparator IC1A responsive to the error signal $\epsilon$ for providing a pulse-width modulated signal CONTROL 1 for controlling switching voltage boosting circuit 20, L1, Q1, CR1. Second comparator IC1A may be responsive to a repetitively varying signal 77 for providing the pulse-width modulated signal CONTROL 2. The reference REFERENCE may include a diode CR2 providing a reference voltage having a negative temperature coefficient or a device IC3 providing a temperature stable reference voltage, or both CR2, IC3.

An electronic circuit 10 for operating a solid state light source LS comprises a switching voltage boosting circuit 20, L1, Q1, CR1 for controllably providing a potential greater than a supply potential, a current regulating circuit 40, Q2 coupled to the switching voltage boosting circuit 20, L1, Q1, CR1 and including a feedback circuit 60, 65, 80, R1, IC2 for sensing the current flowing through a solid state light source LS to control the magnitude thereof, and a control circuit 60, 70, 75, IC1 responsive to an error signal $\epsilon$ of the feedback circuit 60, 65, 80, R1, IC2 of the current regulating circuit 40, Q2 for controlling the switching voltage boosting circuit 20, L1, Q1, CR1 to increase the supply potential when necessary for operating the current regulating circuit 40, Q2. That is, control circuit 60, 65, 80, R1, IC1 the switching voltage boosting circuit 20, L1, Q1, CR1 to provide the potential $V_{OUT}$ that is greater than the supply potential $V_B$ for operating the current regulating circuit 40, Q2. Switching voltage boosting circuit 20, L1, Q1, CR1 may comprise an inductor L1 for receiving a supply potential $V_B$ and connected in series with a rectifier CR1 connected to the current regulating circuit 40, Q2, and a controllable electronic switch Q1 connected to the connection of the inductor L1 and the rectifier CR1, wherein the controllable switch Q1 may be controlled by the control circuit 60, 70, 75, IC1 for controllably providing the potential $V_{OUT}$ that is greater than supply potential $V_B$. Controllable electronic switch Q1 is controlled by a pulse-width modulated signal CONTROL 1 from control circuit 60, 70, 75, IC1. Current regulating circuit 40, Q2 comprises a linear current regulator 40, Q2 coupled between the switching voltage boosting circuit 20, L1, Q1, CR1 and the solid state light source LS, wherein the conduction of linear current regulator 40, Q2 is controlled in a linear manner. The electronic circuit of claim A4 wherein the current regulating circuit 40, Q2 may further comprise a comparator 65, IC2 responsive to a reference REFERENCE and to the current flowing through the solid state light source LS for providing an error signal $\epsilon$ for controlling the current regulating circuit 40, Q2. Control circuit 60, 70, 75, IC1 may further comprise a comparator 70, IC1A responsive to an error signal $\epsilon$ from current regulating circuit 40, Q2 for providing a pulse-width modulated signal CONTROL 1 for controlling the switching voltage boosting circuit 20, L1, Q1, CR1, wherein the error signal $\epsilon$ is responsive to the current flowing through the solid state light source LS. Comparator 70, IC1A may be responsive to a repetitively varying signal 77 for providing the pulse-width modulated signal CONTROL 1. The reference REFERENCE may include a diode CR2 providing a reference voltage having a negative temperature coefficient or a device IC3 providing a temperature stable reference voltage, or both CR2, IC3.

An electronic circuit 10 for operating a solid state light source LS comprises a pair of input terminals T1, T2 for receiving a supply potential therebetween, a pair of output terminals T3, T4 for connecting a solid state light source LS therebetween, a switching voltage boosting circuit 20, L1, Q1, CR1 connected between the input terminals T1, T2 and to a node $V_{OUT}$ for controllably increasing the potential across the input terminals T1, T2 at the node $V_{OUT}$, a linear current regulating circuit 40, Q2 connected between the node $V_{OUT}$ and the output terminals T3, T4 for controlling the current flowing between the output terminals T3, T4, and a control circuit 60, 65, 70, 80, R1, IC1, IC2 responsive to current flowing between the output terminals T3, T4 for controlling the linear current regulating circuit 40, Q2 to control the magnitude of current flowing between the output terminals T3, T4 and for controlling the switching voltage boosting circuit 20, L1, Q1, CR1 to increase the potential at the node $V_{OUT}$ when the supply potential is less than that necessary for operating the linear current regulating circuit 40, Q2. Switching voltage boosting circuit 20, L1, Q1, CR1 may comprise an inductor L1 connected in series with a rectifier CR1 between one of the pair of input terminals T1, T2 and the node $V_{OUT}$, and a controllable electronic switch Q1 connected to the connection of inductor L1 and rectifier CR1, wherein controllable switch Q1 is controlled by the control circuit 60, 70 for controllably providing at the node the potential $V_{OUT}$ greater than a supply potential $V_B$. Controllable electronic switch Q1 may be controlled by a pulse-width modulated signal CONTROL 1 from the control circuit 60, 70. Linear current regulating circuit 40, Q2 may comprise an element Q2 having a controllable conduction path coupled between the node $V_{OUT}$ and one of the pair of output terminals T3, T4, wherein the conduction of the element Q2 is controlled in a linear manner responsive to the current flowing between the output terminals T3, T4. Control circuit 60, 65 may comprise a first comparator IC2 responsive to a reference REFERENCE and to the current flowing between the output terminals T3, T4 for providing an error signal $\epsilon$ for controlling the linear current regulating circuit 40, Q2. Control circuit 60 may further comprise a second comparator 70, IC1A responsive to the error signal ε for providing a pulse-width modulated signal CONTROL 1 for controlling the switching voltage boosting circuit 20, L1, Q1, CR1. Second comparator 70, IC1A may be responsive to a repetitively varying signal 77 for providing the pulse-width modulated signal CONTROL 1. The reference REFERENCE may include a diode CR2 providing a reference voltage having a negative temperature coefficient or a device IC3 providing a temperature stable reference voltage, or both CR2, IC3.

An electronic circuit 10 for a flashlight comprises a battery B providing a voltage, a solid state light source LS, a switching voltage boosting circuit 20, L1, Q1, CR1 coupled for controllably increasing the battery B voltage $V_B$ at a node $V_{OUT}$, a current regulating circuit 40, Q2 coupled to the node, to the switching voltage boosting circuit 20, L1, Q1, CR1 and to the solid state light source LS for controlling the current flowing through the solid state light source LS, and a control circuit 60, 65, 70, 80, R1, IC1, IC2 responsive to the current flowing through the solid state light source LS for controlling the current regulating circuit 40, Q2 to regulate the magnitude of current flowing through the solid state light source LS and for controlling the switching voltage boosting circuit 20, L1, Q1, CR1 to increase the potential at the node $V_{OUT}$ when necessary for operating the current regulating circuit 40, Q2. That is, the switching voltage boosting circuit 20, L1, Q1, CR1 is coupled to the battery B for controllably providing at a node a voltage $V_{OUT}$ that is greater than the battery voltage $V_B$, and the control circuit 60, 65, 70, 80, R1 controls the switching voltage boosting circuit 20, L1, Q1, CR1 to provide at the node the voltage $V_{OUT}$ that is greater than the battery voltage $V_B$ for operating the current regulating circuit 40, Q2. Switching voltage boosting circuit 20, L1, Q1, CR1 may comprise an inductor L1 and a rectifier CR1 connected in series between the battery B and current regulating circuit 40, Q2, and a controllable electronic switch Q1 connected to the connection of inductor L1 and rectifier CR1, wherein controllable switch Q1 is controlled by control circuit 60, 65, 70. Controllable electronic switch Q1 may be controlled by a pulse-width modulated signal CONTROL 1 from the control circuit 60, 65, 70, IC1A. Current regulating circuit 40, Q2 may comprise a linear current regulator Q2 coupled between the switching voltage boosting circuit 20, L1, Q1, CR1 and the solid state light source LS, wherein the conduction of the linear current regulator Q2 is controlled by the control circuit 60, 65 in a linear manner. Control circuit 60, 65, 70 may comprise a first comparator IC2 responsive to a reference REFERENCE and to the current flowing through the solid state light source LS for providing an error signal ε for controlling the current regulating circuit 40, Q2. Control circuit 60, 65, 70, 75 may further comprises a second comparator 70, IC1A responsive to the error signal ε for providing a pulse-width modulated signal CONTROL 1 for controlling the switching voltage boosting circuit 20, L1, Q1, CR1. Second comparator 70, IC1A may be responsive to a repetitively varying signal 77 for providing the pulse-width modulated signal CONTROL 1. The reference REFERENCE may include a diode CR2 providing a reference voltage having a negative temperature coefficient or a device IC3 providing a temperature stable reference voltage, or both CR2, IC3.

An electronic circuit 10 in a flashlight comprises a flashlight housing 12, a battery B disposed in the flashlight housing 12 for providing a voltage, a solid state light source LS disposed in the flashlight housing 12 for projecting light therefrom, a switching voltage boosting circuit 20, L1, Q1, CR1 disposed in the flashlight housing 12 and coupled to the battery B for controllably providing a voltage $V_{OUT}$ greater than the battery B voltage $V_B$, a linear current regulating circuit 40, 60, 65, 80, Q2, R1, IC2 disposed in the flashlight housing 12 and coupled to the switching voltage boosting circuit 20, L1, Q1, CR1, the linear current regulating circuit 40, 60, 65, 80, Q2, R1, IC2 including a feedback circuit 60, 65, 80, R1, IC2 for sensing the current flowing through the solid state light source LS to control the magnitude thereof, and a control circuit 60, 70, 75, IC1, Q3 responsive to an error signal ε of the feedback circuit 60, 65, 80, R1, IC2 of the linear current regulating circuit 40, 60, 65, 80, Q2, R1, IC2 for controlling the switching voltage boosting circuit 20, L1, Q1, CR1 to provide the voltage $V_{OUT}$ greater than the battery B voltage $V_B$ when necessary for the linear current regulating circuit to control the magnitude of the current flowing through the solid state light source LS. Switching voltage boosting circuit 20, L1, Q1, CR1 may comprise an inductor L1 and a rectifier CR1 connected in series between the battery B and the current regulating circuit 40, Q2, and a controllable electronic switch Q1 connected to the connection of inductor L1 and rectifier CR1, wherein controllable switch Q1 is controlled by the control circuit 60, 65, 70 for producing the voltage $V_{OUT}$ that is greater than the battery voltage $V_B$. Controllable electronic switch Q1 may be controlled by a pulse-width modulated signal CONTROL 1 from the control circuit 60, 65, 70. Current regulating circuit 40, Q2 may comprise a linear current regulator Q2 coupled between switching voltage boosting circuit 20, L1, Q1, CR1 and the solid state light source LS, wherein the conduction of linear current regulator Q2 is controlled in a linear manner. Current regulating circuit 40, Q2 may further comprise a comparator 65, IC2 responsive to a reference REFERENCE and to the current flowing through solid state light source LS for providing an error signal ε for controlling current regulating circuit 40, Q2. Control circuit 60 may further comprise a comparator 70, IC1A responsive to an error signal ε from the current regulating circuit 40, Q2, 65, IC2 for providing a pulse-width modulated signal CONTROL 1 for controlling the switching voltage boosting circuit 20, L1, Q1, CR1, wherein the error signal ε is responsive to the current flowing through the solid state light source LS. Comparator 70, IC1A may be responsive to a repetitively varying signal 77 for providing the pulse-width modulated signal CONTROL 1. The reference REFERENCE may include a diode CR2 providing a reference voltage having a negative temperature coefficient or a Zener diode CR3 or a device IC3 providing a temperature stable reference voltage, or any combination of CR2, CR3 and IC3.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such.

Further, what is stated as being "optimum" or "deemed optimum" may or not be a true optimum condition, but is the condition deemed to be "optimum" by virtue of its being selected in accordance with the decision rules and/or criteria defined by the applicable controlling function, e.g., the current flowing in light source LS, or the drain-source operating voltage maintained across transistor Q2.

While the present invention has been described in terms of the foregoing example embodiments, variations within the scope and spirit of the present invention as defined by the claims following will be apparent to those skilled in the art.

For example, the arrangement in which current regulator 20, Q2, light source LS and current sensor 80, R1, are connected, e.g., in series, is immaterial so long as the current flowing through light source LS and current sensor 80, R1 are in known proportion so that linear current regulator 40, Q2 produces a desired magnitude of current in light source LS. By way of example, it is noted that light source LS is connected in series between linear current regulator 40 and current sensor 80 in FIG. 1, whereas linear current regulator transistor Q2 is connected in series between light source LS and current sensor R1 in FIG. 2.

Current regulator 40 is proportionately controllable except when the control element, e.g., transistor Q1, saturates, i.e. operates with so low a voltage between its drain and source that its gain reduces substantially to where it no longer controls the current flowing through light source LS. Current regulator 40 is thus "linear" in the sense of operating proportionately to control the level of current that flows through light source LS, and not necessarily mathematically linearly.

Further, comparator amplifier IC2 may be referred to as a comparator amplifier or as a comparator or as an amplifier, and any of the foregoing will provide the desired comparison and amplification function. Preferably, IC2 is a high-gain differential-input operational amplifier, but other devices may be employed.

A repetitively varying signal having a triangular waveform (i.e. a triangular signal) is described herein as a typical signal for cooperating with a comparator for providing the pulse-width modulated control signal, however, any form of a repetitively varying signal may be employed. For example, a saw-tooth signal, a sinusoidal signal, a staircase signal, and/or any linear or non-linear variant thereof, whether symmetrical or asymmetrical, could be employed.

Although non-rechargeable alkaline and rechargeable Li-ion batteries are described herein, it is noted that one or more batteries of any suitable type and size may be utilized with the present arrangement. Similarly, although the example embodiments may employ three batteries in series, whether in one or more packages, any number of batteries providing a suitable voltage may be employed.

Further, although the circuit arrangement 10 described is typically and preferably operated with a battery B that initially provides a greater voltage than that necessary to cause the light source LS to produce light, and that ultimately discharges to a voltage lower than that necessary to cause the light source LS to produce light, such is not necessary to obtain at least some of the benefit provided by the voltage boosting arrangement 20, or by the linear current regulator 40, or by both. Thus, battery B could initially provide a potential less than that need to operate the solid state light source, or could provide a potential sufficient to operate the solid state light source for a substantial time, or both.

In addition, a "terminal" is used to refer to any place at which an electrical connection may be made, and so could include, e.g., a physical terminal, an electrical conductor, a solderable hole on a circuit board, a wire, a lead, and the like.

Finally, numerical values stated are typical or example values, and are not limiting values. Examples thereof include, but are not limited to, values of capacitances, inductances and resistances, operating voltages, currents, frequencies, light intensity, and the like.

What is claimed is:

1. An electronic circuit for operating a solid state light source comprising:
    a switching voltage boosting circuit for controllably providing a potential greater than a supply potential;
    a current regulating circuit coupled to said switching voltage boosting circuit for controlling current flowing through a solid state light source; and
    a control circuit responsive to current flowing through the solid state light source for controlling said current regulating circuit to control the magnitude of current flowing through the solid state light source and for controlling said switching voltage boosting circuit to provide the potential greater than the supply potential for operating said current regulating circuit.

2. The electronic circuit of claim 1 wherein said switching voltage boosting circuit comprises an inductor for receiving a supply potential and connected in series with a rectifier connected to said current regulating circuit, and a controllable electronic switch connected to the connection of said inductor and said rectifier, wherein said controllable switch is controlled by said control circuit.

3. The electronic circuit of claim 2 wherein said controllable electronic switch is controlled by a pulse-width modulated signal from said control circuit.

4. The electronic circuit of claim 1 wherein said current regulating circuit comprises a linear current regulator coupled between said switching voltage boosting circuit and the solid state light source, wherein the conduction of said linear current regulator is controlled by said control circuit in a linear manner.

5. The electronic circuit of claim 1 wherein said control circuit comprises a first comparator responsive to a reference and to the current flowing through the solid state light source for providing an error signal for controlling said current regulating circuit.

6. The electronic circuit of claim 5 wherein said control circuit further comprises a second comparator responsive to the error signal for providing a pulse-width modulated signal for controlling said switching voltage boosting circuit.

7. The electronic circuit of claim 6 wherein said second comparator is responsive to a repetitively varying signal for providing the pulse-width modulated signal.

8. The electronic circuit of claim 5 wherein said reference includes a diode providing a reference voltage having a negative temperature coefficient or a device providing a temperature stable reference voltage, or both.

9. An electronic circuit for operating a solid state light source comprising:
    a switching voltage boosting circuit for controllably providing a potential greater than a supply potential;
    a current regulating circuit coupled to said switching voltage boosting circuit and including a feedback circuit for sensing the current flowing through a solid state light source to control the magnitude thereof; and
    a control circuit responsive to an error signal of the feedback circuit of said current regulating circuit for controlling said switching voltage boosting circuit to provide the potential greater than the supply potential for operating said current regulating circuit.

10. The electronic circuit of claim 9 wherein said switching voltage boosting circuit comprises an inductor for receiving a supply potential and connected in series with a rectifier connected to said current regulating circuit, and a controllable electronic switch connected to the connection of said inductor and said rectifier, wherein said controllable switch is controlled by said control circuit for controllably providing the potential greater than a supply potential.

11. The electronic circuit of claim 10 wherein said controllable electronic switch is controlled by a pulse-width modulated signal from said control circuit.

12. The electronic circuit of claim 9 wherein said current regulating circuit comprises a linear current regulator coupled between said switching voltage boosting circuit and the solid state light source, wherein the conduction of said linear current regulator is controlled in a linear manner.

13. The electronic circuit of claim 12 wherein said current regulating circuit further comprises a comparator responsive to a reference and to the current flowing through the solid state light source for providing an error signal for controlling said current regulating circuit.

14. The electronic circuit of claim 13 wherein said control circuit further comprises a comparator responsive to an error signal from said current regulating circuit for providing a pulse-width modulated signal for controlling said switching voltage boosting circuit, wherein the error signal is responsive to the current flowing through the solid state light source.

15. The electronic circuit of claim 14 wherein said comparator is responsive to a repetitively varying signal for providing the pulse-width modulated signal.

16. The electronic circuit of claim 13 wherein said reference includes a diode providing a reference voltage having a negative temperature coefficient or a device providing a temperature stable reference voltage, or both.

17. An electronic circuit for operating a solid state light source comprising:
a pair of input terminals for receiving a supply potential therebetween;
a pair of output terminals for connecting a solid state light source therebetween;
a switching voltage boosting circuit connected between the input terminals and to a node for controllably providing at the node a potential greater than the supply potential received at said pair of input terminals;
a linear current regulating circuit connected between the node and the output terminals for controlling the current flowing between the output terminals; and
a control circuit responsive to current flowing between the output terminals for controlling said linear current regulating circuit to control the magnitude of current flowing between the output terminals and for controlling said switching voltage boosting circuit to increase the potential at said node when the supply potential is less than that necessary for operating said linear current regulating circuit.

18. The electronic circuit of claim 17 wherein said switching voltage boosting circuit comprises an inductor connected in series with a rectifier between one of said pair of input terminals and said node, and a controllable electronic switch connected to the connection of said inductor and said rectifier, wherein said controllable switch is controlled by said control circuit for controllably providing at said node the potential greater than a supply potential.

19. The electronic circuit of claim 18 wherein said controllable electronic switch is controlled by a pulse-width modulated signal from said control circuit.

20. The electronic circuit of claim 17 wherein said linear current regulating circuit comprises an element having a controllable conduction path coupled between said node and one of said pair of output terminals, wherein the conduction of said element is controlled in a linear manner responsive to the current flowing between said output terminals.

21. The electronic circuit of claim 17 wherein said control circuit comprises a first comparator responsive to a reference and to the current flowing between said output terminals for providing an error signal for controlling said linear current regulating circuit.

22. The electronic circuit of claim 21 wherein said control circuit further comprises a second comparator responsive to the error signal for providing a pulse-width modulated signal for controlling said switching voltage boosting circuit.

23. The electronic circuit of claim 22 wherein said second comparator is responsive to a repetitively varying signal for providing the pulse-width modulated signal.

24. The electronic circuit of claim 21 wherein said reference includes a diode providing a reference voltage having a negative temperature coefficient or a device providing a temperature stable reference voltage, or both.

25. An electronic circuit for a flashlight comprising:
a battery providing a voltage;
a solid state light source;
a switching voltage boosting circuit coupled to said battery for controllably providing at a node a voltage greater than the battery voltage;
a current regulating circuit coupled to said node, to said switching voltage boosting circuit and to said solid state light source for controlling the current flowing through said solid state light source; and
a control circuit responsive to the current flowing through said solid state light source for controlling said current regulating circuit to regulate the magnitude of current flowing through said solid state light source and for controlling said switching voltage boosting circuit to provide at the node the voltage greater than the battery voltage for operating said current regulating circuit.

26. The electronic circuit of claim 25 wherein said switching voltage boosting circuit comprises an inductor and a rectifier connected in series between said battery and said current regulating circuit, and a controllable electronic switch connected to the connection of said inductor and said rectifier, wherein said controllable switch is controlled by said control circuit.

27. The electronic circuit of claim 26 wherein said controllable electronic switch is controlled by a pulse-width modulated signal from said control circuit.

28. The electronic circuit of claim 25 wherein said current regulating circuit comprises a linear current regulator coupled between said switching voltage boosting circuit and said solid state light source, wherein the conduction of said linear current regulator is controlled by said control circuit in a linear manner.

29. The electronic circuit of claim 25 wherein said control circuit comprises a first comparator responsive to a reference and to the current flowing through said solid state light source for providing an error signal for controlling said current regulating circuit.

30. The electronic circuit of claim 29 wherein said control circuit further comprises a second comparator responsive to the error signal for providing a pulse-width modulated signal for controlling said switching voltage boosting circuit.

31. The electronic circuit of claim 30 wherein said second comparator is responsive to a repetitively varying signal for providing the pulse-width modulated signal.

32. The electronic circuit of claim 29 wherein said reference includes a diode providing a reference voltage having a negative temperature coefficient or a device providing a temperature stable reference voltage, or both.

33. An electronic circuit in a flashlight comprising:
a flashlight housing;
a battery disposed in said flashlight housing for providing a voltage;
a solid state light source disposed in said flashlight housing for projecting light therefrom;

a switching voltage boosting circuit disposed in said flashlight housing and coupled to said battery for controllably providing a voltage greater than the battery voltage;

a linear current regulating circuit disposed in said flashlight housing and coupled to said switching voltage boosting circuit, said linear current regulating circuit including a feedback circuit for sensing the current flowing through said solid state light source to control the magnitude thereof; and a control circuit responsive to an error signal of the feedback circuit of said linear current regulating circuit for controlling said switching voltage boosting circuit to provide the voltage greater than the battery voltage when necessary for said linear current regulating circuit to control the magnitude of the current flowing through said solid state light source.

34. The electronic circuit of claim 33 wherein said switching voltage boosting circuit comprises an inductor and a rectifier connected in series between said battery and said current regulating circuit, and a controllable electronic switch connected to the connection of said inductor and said rectifier, wherein said controllable switch is controlled by said control circuit for producing the voltage greater than the battery voltage.

35. The electronic circuit of claim 34 wherein said controllable electronic switch is controlled by a pulse-width modulated signal from said control circuit.

36. The electronic circuit of claim 33 wherein said current regulating circuit comprises a linear current regulator coupled between said switching voltage boosting circuit and said solid state light source, wherein the conduction of said linear current regulator is controlled in a linear manner.

37. The electronic circuit of claim 36 wherein said current regulating circuit further comprises a comparator responsive to a reference and to the current flowing through said solid state light source for providing an error signal for controlling said current regulating circuit.

38. The electronic circuit of claim 37 wherein said control circuit further comprises a comparator responsive to an error signal from said current regulating circuit for providing a pulse-width modulated signal for controlling said switching voltage boosting circuit, wherein the error signal is responsive to the current flowing through said solid state light source.

39. The electronic circuit of claim 38 wherein said comparator is responsive to a repetitively varying signal for providing the pulse-width modulated signal.

40. The electronic circuit of claim 37 wherein said reference includes a diode providing a reference voltage having a negative temperature coefficient or a device providing a temperature stable reference voltage, or both.

41. The electronic circuit of claim 1 wherein said current regulating circuit includes a feedback circuit for sensing the current flowing through a solid state light source to control the magnitude thereof.

42. The electronic circuit of claim 17 wherein said linear current regulating circuit includes a feedback circuit for sensing the current flowing through a solid state light source to control the magnitude thereof.

43. The electronic circuit of claim 25 wherein said current regulating circuit includes a feedback circuit for sensing the current flowing through a solid state light source to control the magnitude thereof.

44. The electronic circuit of claim 1 disposed in a flashlight, said flashlight comprising a flashlight housing and a solid state light source connected to said current regulating circuit and disposed in said flashlight housing for projecting light therefrom.

45. The electronic circuit of claim 9 disposed in a flashlight, said flashlight comprising a flashlight housing and a solid state light source connected to said current regulating circuit and disposed in said flashlight housing for projecting light therefrom.

46. The electronic circuit of claim 17 disposed in a flashlight, said flashlight comprising a flashlight housing and a solid state light source connected to said pair of output terminals and disposed in said flashlight housing for projecting light therefrom.

47. The electronic circuit of claim 25 disposed in a flashlight, said flashlight comprising a flashlight housing having said solid state light source disposed therein for projecting light therefrom.

\* \* \* \* \*